United States Patent
DiFilippo

(10) Patent No.: US 7,416,250 B1
(45) Date of Patent: Aug. 26, 2008

(54) MOTORCYCLE SEAT COVER

(76) Inventor: Richard DiFilippo, 414 Elmwood Ave., Apt. 2H, Brooklyn, NY (US) 11230

( * ) Notice: Subject to any disclaimer, the term of this patent is extended or adjusted under 35 U.S.C. 154(b) by 0 days.

(21) Appl. No.: 11/390,043

(22) Filed: Mar. 27, 2006

(51) Int. Cl.
*A47C 31/00* (2006.01)

(52) U.S. Cl. .............................. 297/228.11; 297/228.1; 297/219.1

(58) Field of Classification Search ............ 297/195.12, 297/219.1, 219.11, 219.12, 228.11
See application file for complete search history.

(56) References Cited

U.S. PATENT DOCUMENTS

| | | | |
|---|---|---|---|
| 536,538 A | | 3/1895 | McIntire |
| 1,853,742 A | | 4/1932 | Owen et al. |
| 3,537,746 A | | 11/1970 | Peters |
| 3,836,196 A | | 9/1974 | Hu |
| 4,171,145 A | | 10/1979 | Pearson, Sr. |
| 4,283,084 A | | 8/1981 | Gallagher |
| 4,319,781 A | | 3/1982 | Tsuge |
| 5,080,431 A | * | 1/1992 | Frazier .................. 297/184.11 |
| 5,388,887 A | * | 2/1995 | Read ........................ 297/195.1 |
| 5,488,981 A | | 2/1996 | Burkhart |
| 5,791,730 A | * | 8/1998 | Hoffacker ................. 297/195.1 |
| 6,007,149 A | * | 12/1999 | Yates ......................... 297/214 |
| 6,012,770 A | | 1/2000 | Rubin |
| 6,086,149 A | * | 7/2000 | Atherley ................... 297/195.1 |
| 6,253,977 B1 | | 7/2001 | Greger et al. |
| 6,516,844 B1 | | 2/2003 | Henry |
| 2003/0234565 A1 | * | 12/2003 | McCurdy ............... 297/219.11 |
| 2005/0046249 A1 | * | 3/2005 | Crumley et al. ........... 297/218.4 |
| 2005/0110314 A1 | * | 5/2005 | Buselmeier ............ 297/219.11 |
| 2005/0146172 A1 | * | 7/2005 | McCurdy .................... 297/199 |
| 2006/0232111 A1 | * | 10/2006 | Hasegawa et al. ...... 297/219.11 |

FOREIGN PATENT DOCUMENTS

WO WO03/086846 10/2003

* cited by examiner

*Primary Examiner*—Anthony D Barfield
(74) *Attorney, Agent, or Firm*—Michael I Kroll

(57) ABSTRACT

A pliable seat cover having an elastic strap positioned along the hem of the seat cover to maintain the selective positioning thereof. The cover is comprised of a flexible sheet fabricated of a chemically resistive material having waterproof and soil proof capabilities for protecting the seat top and sides. The seat cover is designed to protect the seat during application of detergents and cleaners and keep the seat dry during inclement weather.

5 Claims, 15 Drawing Sheets

MOTORCYCLE SEAT COVER

BACKGROUND OF THE INVENTION

1. Field of the Invention

The present invention relates generally to seatcovers and, more specifically, to a pliable seat cover having a fastening means for attachment to a motorcycle seat. The fastening means can be comprised of an adhesive with a cover sheet wherein the backing paper is remove and the cover applied to the seat, which is selective disposable. The present invention also provides for an elastic strap positioned along the hem of the seat cover to maintain the selective positioning thereof. Furthermore, the present invention provides for an adhesive member posited on the hem as the fastening means. In addition the fastening member can be a drawstring positioned within the seat hem. The cover is comprised of a flexible sheet fabricated of a chemically resistive material having waterproof and soil proof capabilities for protecting the seat top and sides. The seat cover is designed to protect the seat during application of detergents and cleaners and keep the seat dry during inclement weather.

When detailing a motorcycle, water and cleaning fluids frequently permeate the seat and soak the foam padding and could corrode the metal seat frame. The foam padding takes time to dry and if the rider desires to ride within a short period of time thereafter, his or her clothing could wick the moisture away from the damp seat and cause discomfort. Use of the present invention during detailing will protect the seat and frame and prevent the seat from absorbing moisture.

Furthermore, many motorcycles include an option for a heated seat and use of the seat cover of the present invention will also protect the heating elements in such situations, as well as electronic components under the seat.

In addition, there is a rider safety feature, when using the present invention that could prevent power failure. Most motorcycles have electric circuits, electronic components and power supply mounted under the seat. If water were to cause an electrical short circuit while the cycle is in motion, a power failure could occur. This failure could compromise the safety of the motorcyclist and passenger.

The seat cover of the present invention is available in a plurality of shapes and sizes to suit any available model motorcycle seat in order to afford a secure fit when applied to the seat.

The present invention also provides for additional elements wherein the present invention can incorporate a drawstring for cinching the seat cover to the motorcycle seat.

The present invention also provides for additional elements wherein the cover of the present invention can incorporate a self sticking adhesive backing for securing the seat cover to the seat.

2. Description of the Prior Art

There are other covers designed for protecting seats. Typical of these is U.S. Pat. No. 536,538 issued to McIntire on Mar. 26, 1895.

Another patent was issued to Owen et al on Apr. 12, 1932 as U.S. Pat. No. 1,853,742. Yet another U.S. Pat. No. 3,537,746 was issued to Peters on Nov. 3, 1970 and still yet another was issued on Sep. 17, 1974 to Hu as U.S. Pat. No. 3,836,196.

Another patent was issued to Pearson, Sr. on Oct. 16, 1979 as U.S. Pat. No. 4,171,145. Yet another U.S. Pat. No. 4,283,084 was issued to Gallagher on Aug. 11, 1981. Another was issued to Tsuge on Mar. 16, 1982 as U.S. Pat. No. 4,319,781 and still yet another was issued on Jan. 14, 1992 to Frazier as U.S. Pat. No. 5,080,431.

Another patent was issued to Burkhart on Feb. 6, 1996 as U.S. Pat. No. 5,488,981. Yet another U.S. Pat. No. 6,012,770 was issued to Rubin on Jan. 11, 2000. Another was issued to Greger et al. on Jul. 3, 2001 as U.S. Pat. No. 6,253,977 and another was issued on Feb. 11, 2003 to Henry as U.S. Pat. No. 6,516,844. Still yet another patent application was published on Oct. 23, 2003 as International Publication Number WO 03/086846 for Tillyer et al.

U.S. Pat. No. 536,538

Inventor: William C. McIntire

Issued: Mar. 26, 1895

As a new article of manufacture a bicycle saddle cover composed of waterproof elastic material, with overlapping flanges to embrace the edges of the saddle, and adapted to be held in position by the contractive action of the material, substantially as and for the purpose set forth.

U.S. Pat. No. 1,853,742

Inventor: Jones L. Owen, et al.

Issued: Apr. 12, 1932

A cover for vehicles comprising a spring-actuated roller mounted at one end of the vehicle, and a protecting web wound on the roller and adapted to be unwound over the vehicle against the tension of the spring, the free end of the web being adapted to be secured to the other end of the vehicle, the web being provided with an opening for the head of the driver.

U.S. Pat. No. 3,537,746

Inventor: Thomas A. Peters

Issued: Nov. 3, 1970

A normally retracted controllably extendable protective cover for a motorcycle seat, comprising: a housing means having a hollow protective sheet receiving storage chamber defined therewithin; and a thin, waterproof flexible protective sheet including side portions and a longitudinal central portion of a length and width, when fully extended and opened, sufficient to completely cover a motor cycle seat and adapted to have said side portions thereof folded downwardly in partially side-encompassing relationship with respect to a motorcycle seat and an underlying upper portion of a motor cycle, said protective sheet being substantially wider than the maximum lateral dimension of said protective sheet receiving storage chamber within said housing means and normally having said side portions of said protective sheet folded over said central portion thereof in overlapped multiple-layer relationship so as to have an over-all folded width less than said maximum lateral dimension of said protective sheet receiving storage chamber whereby to be capable of being, and normally being, received and stored in spirally rolled storage relationship therewithin, said central portion of said sheet having a free outer end normally projecting outwardly from said storage chamber when said folded sheet is fully stored in spirally wound storage relationship therewithin; said housing means being provided with fastening and attachment means carried thereby for rigid structural attachment with respect to a corresponding rigid structural portion of a motor cycle at a position behind and extending above the level of a motorcycle seat which is to be protected from the elements when a motorcycle carrying same is parked and said normally folded, fully retracted, spirally wound and stored protective sheet is extended from said storage chamber unfolded, and placed in retained, overlying and partially side encompassing relationship with respect to a motorcycle seat.

U.S. Pat. No. 3,836,196

Inventor: Chin-I Hu

Issued: Sep. 17, 1974

A saddle cover for cycles comprising a layer normally covering a saddle body, and a protective cover forming an extension of the layer, which normally is folded under the layer and affixed to the body and which is used to cover the layer and fastened together with fasteners thereby to protect the layer from the elements.

U.S. Pat. No. 4,171,145

Inventor: Roger W. Pearson, Sr.

Issued: Oct. 16, 1979

A retractable protective covering which may be unrolled from a spring loaded spool mounted in a housing attached to a motorcycle behind the motorcycle seat to cover the seat and the tank of the motorcycle. The protective covering includes a long, substantially rectangular top panel formed of heavy waterproof material and two long, narrow upper side panels and two long, narrow lower side panels. Each side panel includes an upper panel and a lower panel hinged to the upper panel by means of a strip of flexible fabric. A pair of V-shaped members fastened to opposite sides of the housing serve as guides to guide the unfolding of the upper and lower panels as the protective cover is extended.

U.S. Pat. No. 4,283,084

Inventor: Donald A. Gallagher

Issued: Aug. 11, 1981

A lightweight covering for a motorcycle that can be folded into a compact handsize package when not in use. The covering extends from the back of a motorcycle seat to the front of the tank and covers both sides of the engine. Side loops are provided for securing the cover to corresponding motorcycle foot posts and opposing front corners are adapted to overlap in front of the engine and releasably attach to each other.

U.S. Pat. No. 4,319,781

Inventor: Kenji Tsuge

Issued: Mar. 16, 1982

A bicycle seat cover with which friction on the bicyclist is minimized. This end result is achieved by providing the cover with a compliant central portion which may be fabricated of a polyurethane foam, this central portion having a middle layer thereover of a low friction material, such as a polyethylene, and finally an outer layer over the polyethylene layer which is of soft material and which has an inner surface of low friction material, such as an acrylic resin coating, and an outer surface of a soft material, such as a suitable nylon. The outer cover fits over the bicycle seat and has an elastic ring-shaped band on the bottom portions thereof which grips the cover to the bicycle seat.

U.S. Pat. No. 5,080,431

Inventor: Dan F. Frazier

Issued: Jan. 14, 1992

A device for protecting a motorcycle seat which includes a retractable cover which can be extended to shield the surface of the seat from exposure, thereby preventing deterioration of the seat. The cover is retracted into a housing which can fit snugly underneath the bottom of the seat or can alternatively be mounted to the frame of the motorcycle directly adjacent the lower edge of the seat. When in extended position, the cover can be secured by means of a hook and loop type fastener or by means of a post and hole fastening mechanism. The cover is made of a material which is both waterproof and heat resistant. The housing provides a spring biased wind-up mechanism for easy retraction of the cover and to provide tension to the cover when in extended position thereby aiding in keeping the cover snugly fitted to the seat.

U.S. Pat. No. 5,488,981

Inventor: Steven C. Burkhart

Issued: Feb. 6, 1996

There is disclosed an anti-cat protective or deterrent device for vehicles, the device comprising a flexible mat, which may be made of rubber, neoprene, leather, plastic or any other flexible material, having an upper surface and a lower surface, and a number of small elements attached in a closely-spaced relationship to the upper surface of the mat so as to project outwardly therefrom. Elastic cords are provided for detachably attaching the mat to a desired vehicle surface from which cats (and other small animals) are to be deterred from sleeping. The elements projecting from the mat may be in the shape of an inverted cone or a short cylinder. The elements are spaced apart from one another on the upper surface of the mat from about one-half inch to about one inch, center to center and project outwardly from said upper surface of said mat by between about one-half inch and about one inch. In an embodiment, the device is edge-contoured to fit onto a conventional motorcycle seat.

U.S. Pat. No. 6,012,770

Inventor: Robert Rubin

Issued: Jan. 11, 2000

On the seat of a motorcycle, a strap, typically located between the front and rear seats of the motorcycle seat, may be grasped by the rear seat passenger. A cover for the entire seat is stowed in a pocket in the strap. The pocket is openable to permit deployment of the cover over the seat and the cover may be re-stowed within the pocket in the strap. Closure elements close the pocket of the strap.

U.S. Pat. No. 6,253,977

Inventor: Martin Greger, et al

Issued: Jul. 3, 2001

A removable seat cover is provided for a rear passenger accommodating part of a motorcycle seat. The seat cover is connected with a supporting device in the form of a backpack which allows the seat cover to be worn around a human body so that it cannot be lost when it is not in a rear seat part covering position.

U.S. Pat. No. 6,516,844

Inventor: Daniel A. Henry

Issued: Feb. 11, 2003

The invention is a sunscreen protector for motorcycles that covers the seat and fuel tank area to protect these components from the deteriorating effects of sunlight. The protector shade includes a rectangular sheet of tightly woven nylon/lycra elastomeric material sized to cover only the motorcycle seat and fuel tank. Four elastic strap members and a plurality of hook loop members with attached, coated J-hook members are employed for attachment to selected attachment points on the motorcycle.

International Patent Publication Number WO 03/086846

Inventor: Patricia P. Tillyer et al.

Published: Oct. 23, 2003

The cover includes a high friction flexible material 1 with a bias binding 2 attached to the outer edge through which runs a draw string 3. The draw string 3 permits the seat cover to fit more closely to the motorcycle seat 5 and also acts as a fastening once tied.

While these protective devices may be suitable for the purposes for which they were designed, they would not be as suitable for the purposes of the present invention, as hereinafter described.

SUMMARY OF THE PRESENT INVENTION

Currently while cleaning a motorcycle, chemicals and detergents are applied along with water, when the seats inner cushion or padding gets wet it stays wet for a length of time. It's common for the seat's cushion to be wet for hours after washing/detailing the motorcycle. This causes the seat of the riders pants to get wet when riding and sometime even undergarments.

Therefore, a need exists for a seat cover that will protect the seat and the seat inner structure.

Through use of the present invention, the seat's inner cushion will not absorb water and the metal seat frame will not rust from the padding getting wet during washing and inclement weather.

Additionally, those seats having heating elements incorporated therein are provided means for protecting the heating element components.

In addition there is a rider safety feature when using the present invention that could prevent power failure. Most motorcycles have electric circuits, electronic components and power supply, the battery mounted under the seat, if water were to cause a short circuit while the motor cycle is in motion a power failure can occur. This failure could compromise the safety of the motorcyclist and its passengers.

A primary object of the present invention is to provide a cover for a motorcycle seat fabricated of a material resistive to detergents and cleaners and is fluid impermeable.

Another object of the present invention is to provide a cover for a motorcycle seat fabricated of a soft material engaging said seat.

Yet another object of the present invention is to provide means for cinching the seat cover about the motorcycle seat.

Another object of the present invention is to provide a seat cover having a hem to prevent wicking of fluid along the edges of the seat cover.

Yet another object of the present invention is to provide said motorcycle seat cover in various shapes to conform substantially to the style of seat.

Still yet another object of the present invention is to provide a motorcycle seat cover that will protect the seat during application of cleaners and keep the seat dry during inclement weather.

Another object of the present invention is to provide a rider safety feature.

Yet another object of the present invention is to provide power failure protection.

Still yet another object of the present invention is to protect the electrical circuits from corrosion.

Additional objects of the present invention will appear as the description proceeds.

The present invention overcomes the shortcomings of the prior art by providing a pliable seat cover having an attachment means that includes an adhesive backing for securing the seat cover in the selected position. The present invention also provides for a hem positioned fastening means including an adhesive strip with a removable backing sheet, an elastic strap positioned along the hem of the seat cover and/or drawstring positioned in the hem whereby any of the fastening means maintains the selective positioning thereof. The cover is fabricated of a chemically resistive material having water proof and soil proof capabilities for protecting the seat top and sides and extends over the lower edge providing a lip for runoff and to prevent wicking of the liquid. The seat cover is designed to protect the seat during application of detergents and cleaners and keep the seat dry during inclement weather.

Furthermore, there is a rider safety feature that when using the present invention, it can prevent power failure. Motorcycles have electric circuits, electronic components and the power supply mounted under the seat. If water were to cause a short circuit while the motorcycle is in motion, a power failure can occur. This failure could compromise the safety of the motorcyclist and its passengers.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
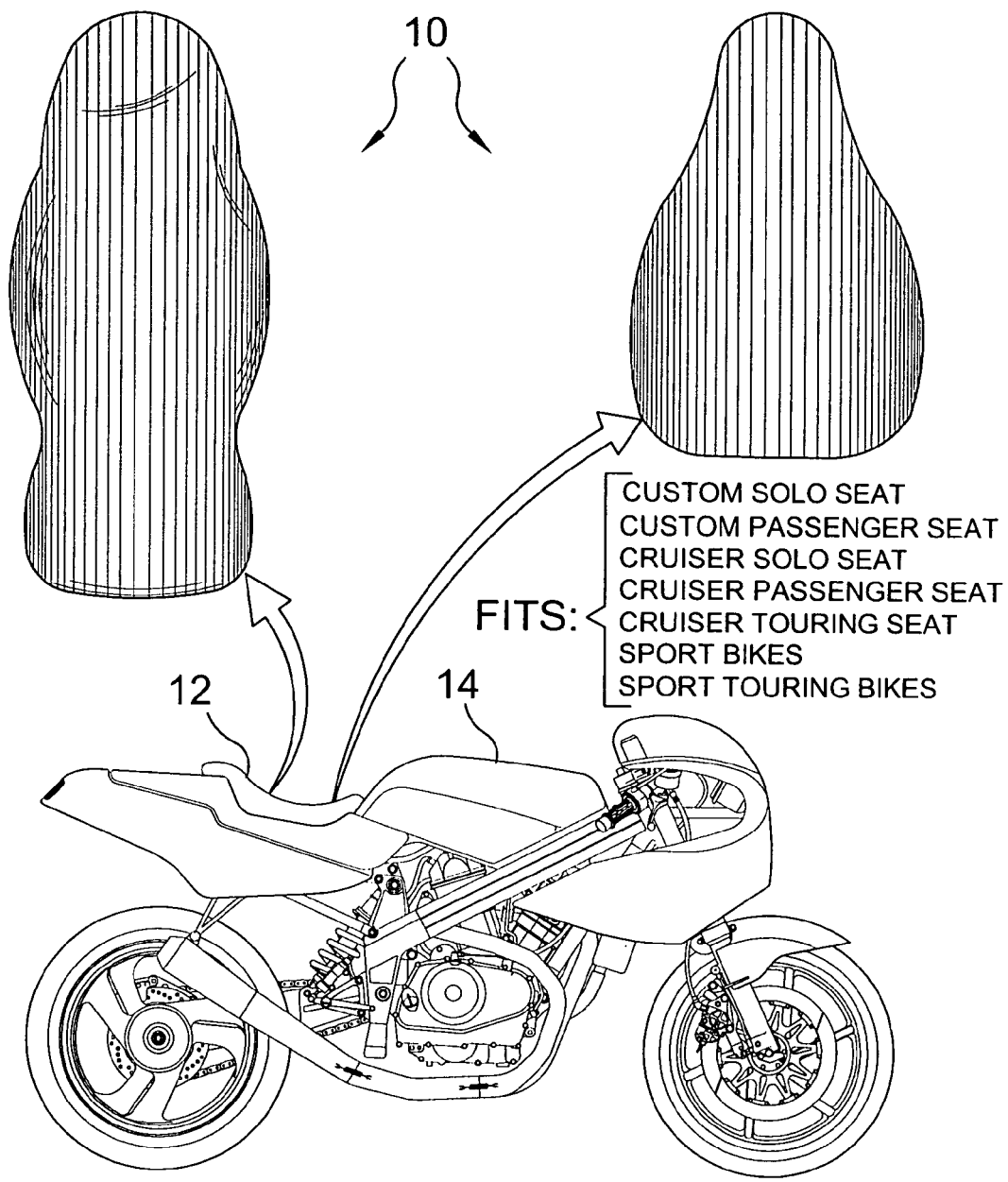
FIG. 1 is an illustrative view of the present invention in use.

Turning now descriptively to the drawings, in which similar reference characters denote similar elements throughout the several views, the figures illustrate the Motorcycle Seat Cover of the present invention. With regard to the reference numerals used, the following numbering is used throughout the various drawing figures.

10 Motorcycle Seat Cover of the present invention
12 motorcycle seat
13 motorcycle seat securing means
14 motorcycle
15 adhesive strip
16 elastic band
18 impermeable material
20 top side of 10
22 bottom side of 10
24 adhesive layer
25 adhesive layer backing sheet
26 drawstring
28 hem

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention in 10 use. The present invention is a motorcycle seat cover 10 comprised of a chemically resistive material having waterproof and soil proof capabilities. The device is designed to protect a motorcycle seat 12 from the elements as well as chemical and detergent cleaners that could be absorbed by the foam padding which could then take a few hours to dry. The seat cover 10 also protects the motorcycle seat 12 material whether leather, suede, etc. from becoming dull or old looking from the weather and/or cleaning agents used on the bike. In addition, there is a rider safety feature that when using the present invention 10, it can prevent power failure. Motorcycles 14 have electrical circuits, electronic components and the power supply mounted under the seat 12. If water were to cause a short circuit while the motor cycle is in motion, a power failure can occur. This failure could compromise the safety of the motorcyclist and its passengers. An adjustable elastic band is provided that encompasses the lower peripheries of said seat cover 10 to secure the cover to said motorcycle seat 12.

Figure 2:
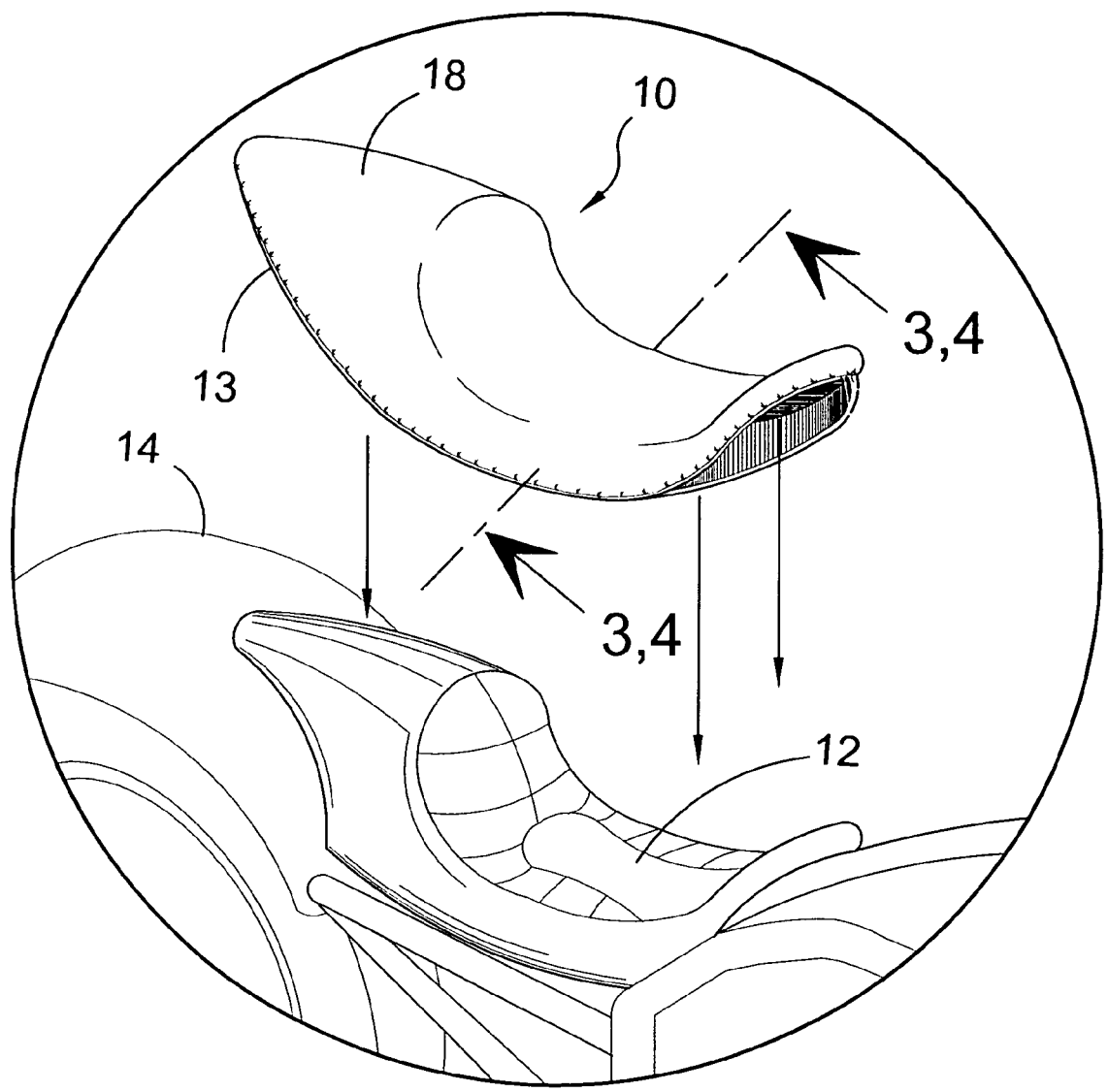
FIG. 2 is a perspective view of the present invention in use.

FIG. 2 is a perspective view of the present invention 10 in use. Shown is the motorcycle 14 seat cover 10 having an a fastening means 13 positioned on the back side 22 of seat cover 10 or peripherally positioned along the hem 28 of seat cover 10 to maintain the positioning thereof. The cover is comprised of a chemically resistive material 18 having waterproof and soil proof capabilities. The seat cover 10 is designed to protect the seat 12 during application of water, detergents and cleaners and inclement weather. It also protects the electrical circuits, electronic components and power supply, the battery, from power failure and acts as a safety feature for the motorcyclist and passenger against power failure while in motion. Therefore not comprising the safety of its riders.

Figure 3:
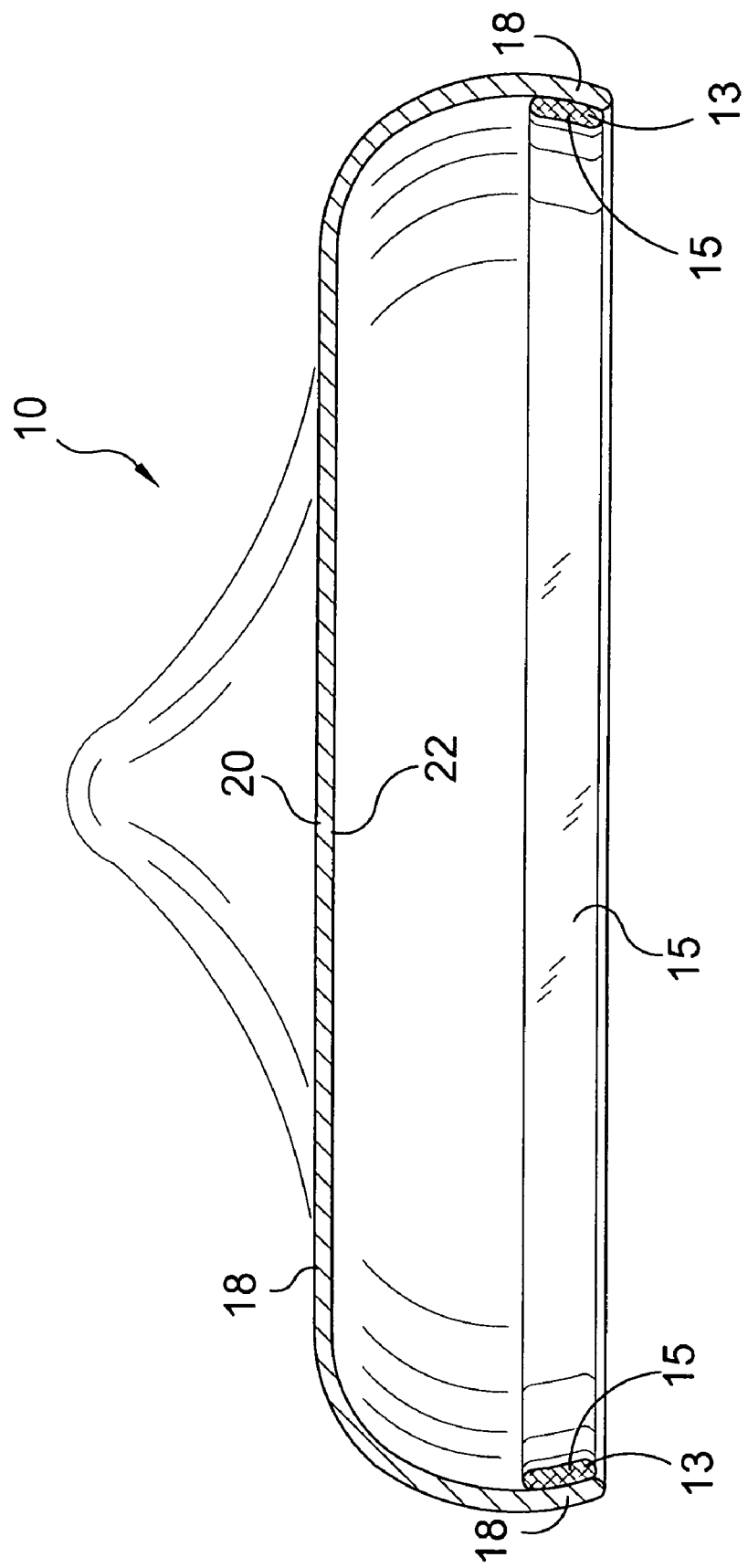
FIG. 3 is a cross sectional view of the seat cover having an adhesive strip positioned on the hem.

FIG. 3 is a cross sectional view of the seat cover 10. Shown is a cross sectional view of the motorcycle seat cover 10 of the present invention, taken from FIG. 2 as indicated. The present invention is a pliable seat cover 10 having a securing means 13 positioned on the underside 22 of seat cover 10. an elastic strap 16 positioned along the hem of the seat cover 10 to maintain the selective positioning of the seat cover 10. A hem 28 is disposed along the peripheral edge of said seat cover 10 forming means to prevent water from wicking under the cover of the present invention. The seat cover 10 is comprised of a chemically resistive material 18 having water proof and soil proof capabilities for protecting the seat top and sides and extends over the lower edge of the bottom providing for runoff and to prevent wicking of the liquid into the bottom of the motorcycle seat. The seat cover 10 is designed to protect the seat during application of water, detergents and cleaners and keep the seat dry during inclement weather. It also prevents power failure while the motorcycle is in motion, keeping the motorcyclist and passenger safety from being compromised. The top 20 of the seat cover 10 provides for run-off of fluids and chemical agents and the bottom 22 protects the seat from scuffing.

Figure 4:
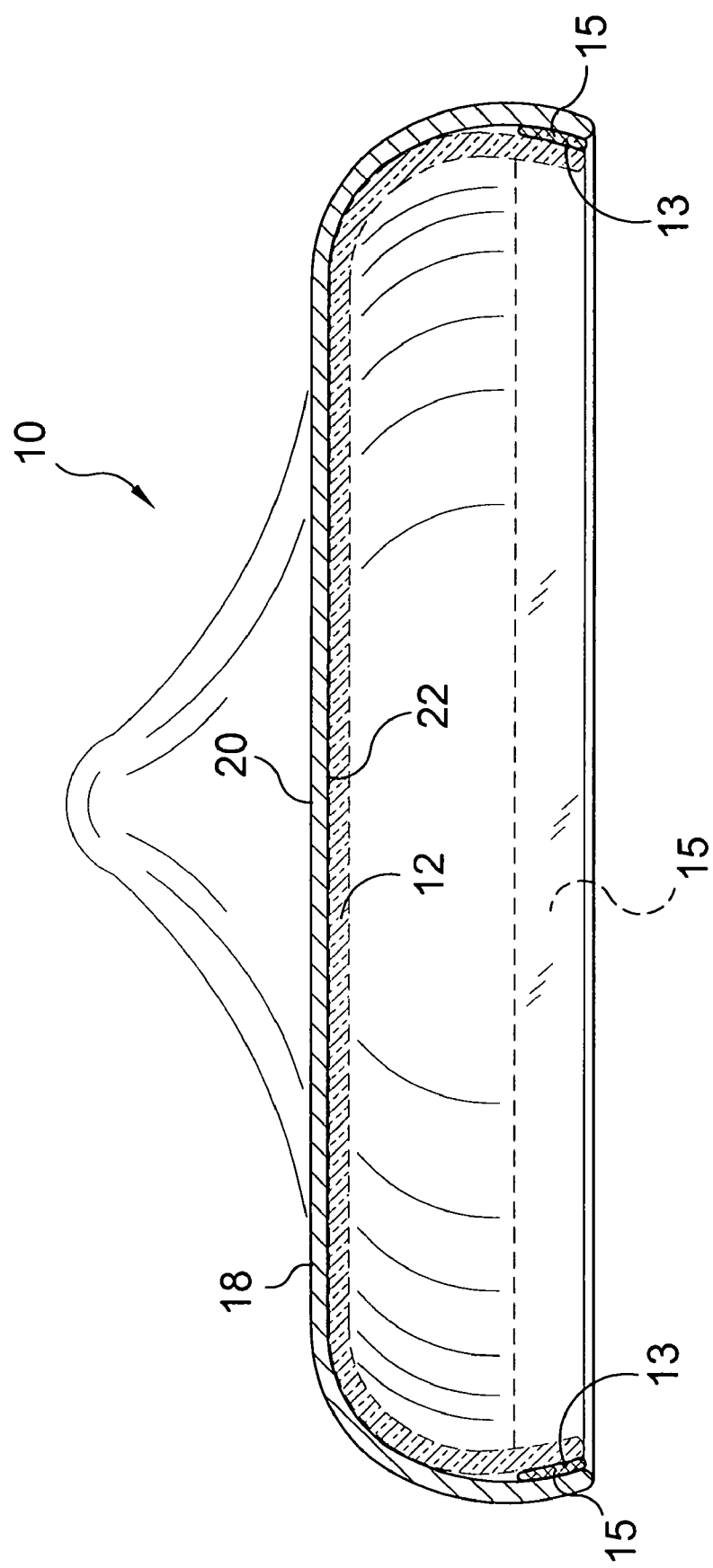
FIG. 4 is a cross sectional view of the seat cover having an adhesive strip for attachment to the motorcycle seat.

FIG. 4 is a cross sectional view of the seat cover 10. Shown is a cross sectional view of the motorcycle seat cover 10 of the present invention, taken from FIG. 2 as indicated. The present invention is a pliable seat cover 10 having a securing means 13 positioned on the underside 22 of seat cover 10. As illustrated the fastening means 13 can be an adhesive strip having a peelably removable backing 25 positioned approximate the hem 28 of the seat cover 10 to maintain the selective positioning of the seat cover 10. The hem 28 is disposed along the peripheral edge of said seat cover 10 forming means to prevent water from wicking under the cover of the present invention. As aforementioned, the seat cover 10 is comprised of a chemically resistive material 18 having water proof and soil proof capabilities for protecting the seat top and sides and extends over the lower edge of the bottom providing for runoff and to prevent wicking of the liquid into the bottom of the motorcycle seat. The seat cover 10 is designed to protect the seat during application of water, detergents and cleaners and keep the seat dry during inclement weather. It also prevents power failure while the motorcycle is in motion, keeping the motorcyclist and passenger safety from being compromised. The top 20 of the seat cover 10 provides for run-off of fluids and chemical agents with the bottom 22 engaging the protected motorcycle seat 12. The attachment means 13 can be an adhesive strip that adheres to the sides of motor cycle seat 12.

Figure 5:
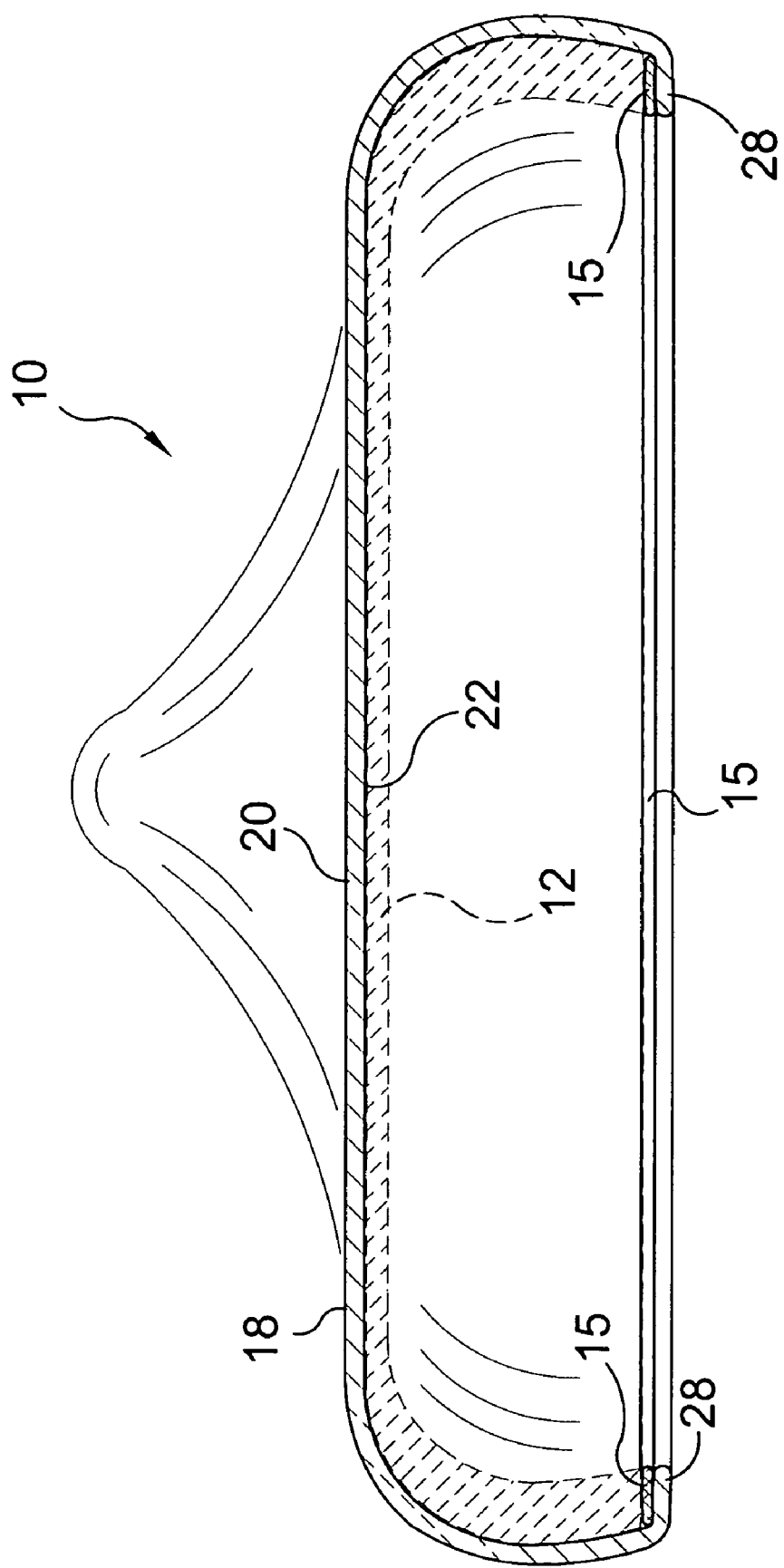
FIG. 5 is a sectional view of the seat cover having an adhesive strip for attachment to the base of the motorcycle seat.

FIG. 5 is a sectional view of the seat cover 10. Shown is a is a pliable seat cover 10 having a securing means 13 positioned approximate hem 28 of cover 10 whereby the fastening element 13, which as illustrated is an adhesive band positioned approximate the hem of cover 10, that can be secured to the bottom of the motorcycle seat to be protected. The seat cover 10 is designed to protect the seat during application of water, detergents and cleaners and keep the seat dry during inclement weather. It also prevents power failure while the motorcycle is in motion, keeping the motorcyclist and passenger safety from being compromised. Alternately, the seat cover 10 can be selectively discarded as needed and periodically replaced as desired.

Figure 6:
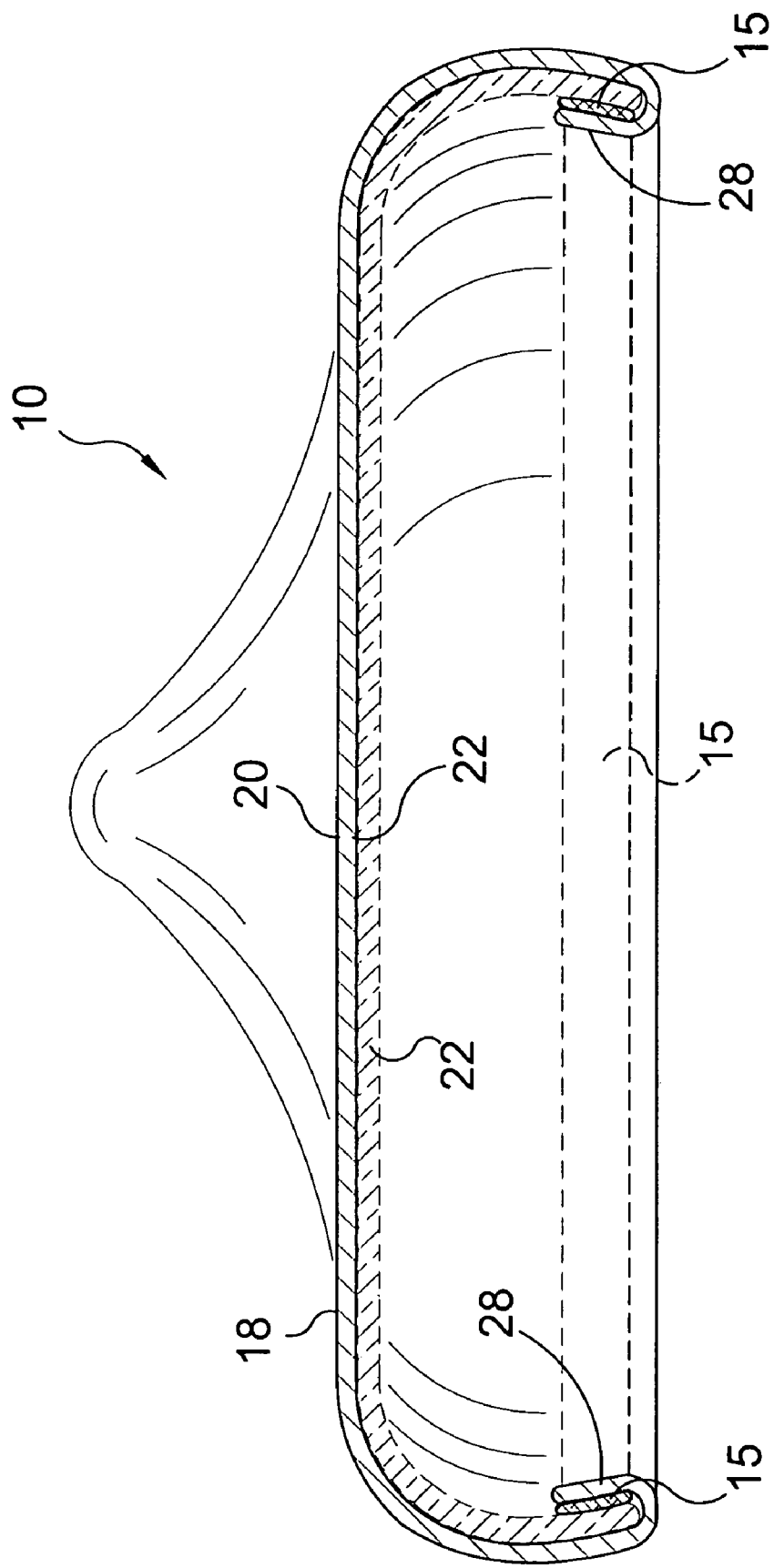
FIG. 6 is a sectional view of the seat cover having an adhesive strip for attachment to the interior side of the motorcycle seat.

FIG. 6 is a sectional view of the seat cover 10. Shown a pliable seat cover 10 having a securing means 13 positioned approximate hem 28 of cover 10 whereby the fastening element 13, which as illustrated is an adhesive band positioned approximate the hem of cover 10, that can be secured to the interior side of the motorcycle seat to be protected. The seat cover 10 is designed to protect the seat during application of water, detergents and cleaners and keep the seat dry during inclement weather. It also prevents power failure while the motorcycle is in motion, keeping the motorcyclist and passenger safety from being compromised. Alternately, the seat cover 10 can be selectively discarded as needed and periodically replaced as desired.

Figure 7:
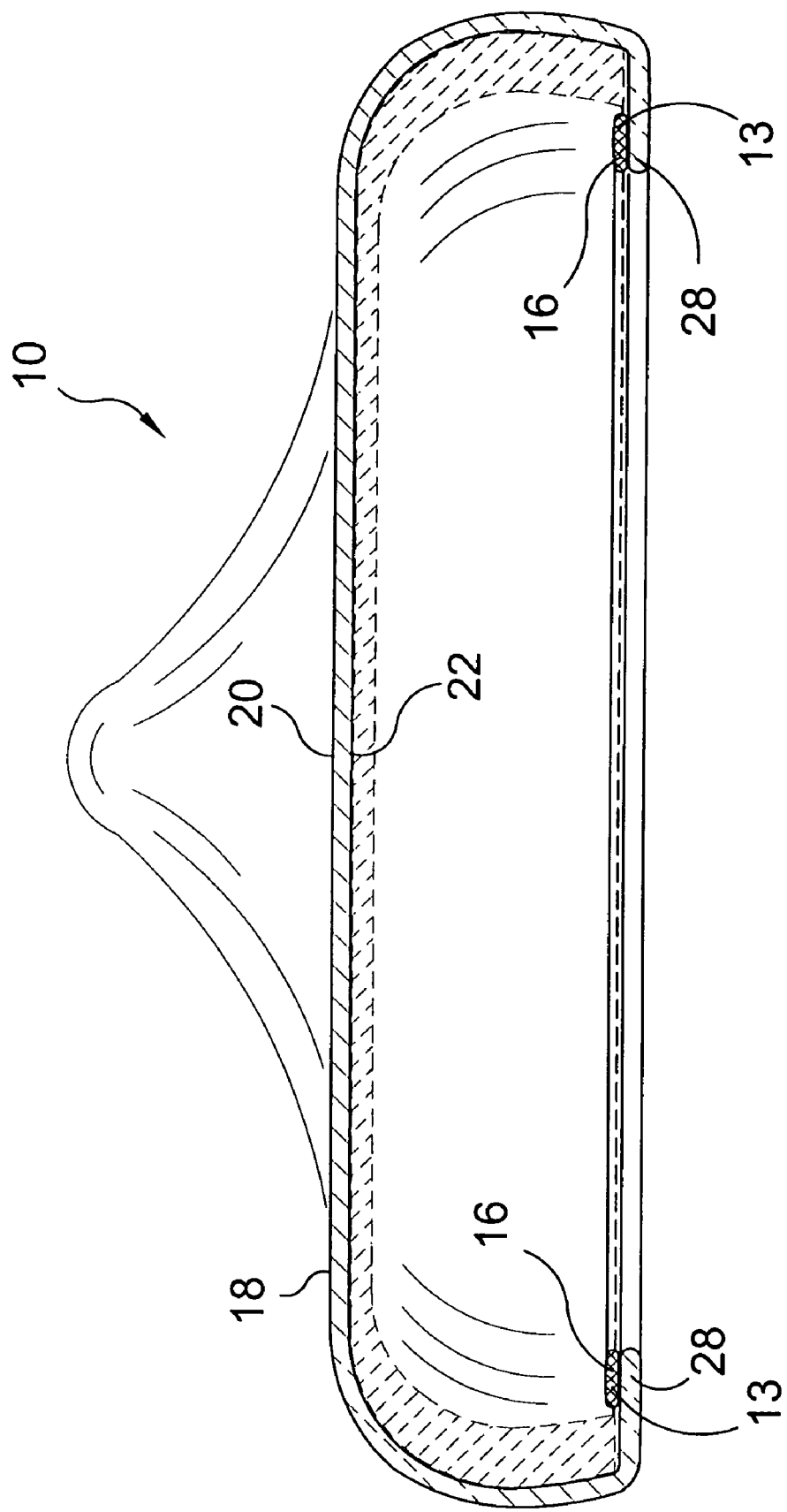
FIG. 7 is a sectional view of the seat cover having an elastic band for securing the seat cover to the motorcycle seat.

FIG. 7 is another sectional view of the seat cover 10. Shown is a sectional view of the motorcycle seat cover 10 of the present invention having securing means 13 positioned approximate hem 28 of cover 10. The present invention provides a pliable seat cover 10 having a securing means 13 whereby said seat cover 10 is releasably fixed to a desired motorcycle seat 12 as a protective member. Shown is the securing means 13 as an elastic band fixed approximate hem 28 of seat cover 10 to prevent displacement of seat cover 10 once attached to motorcycle seat 12. As illustrated, the securing means is comprised of an elastic band 16 positioned approximate the hem 28 of seat cover 10.

Figure 8:
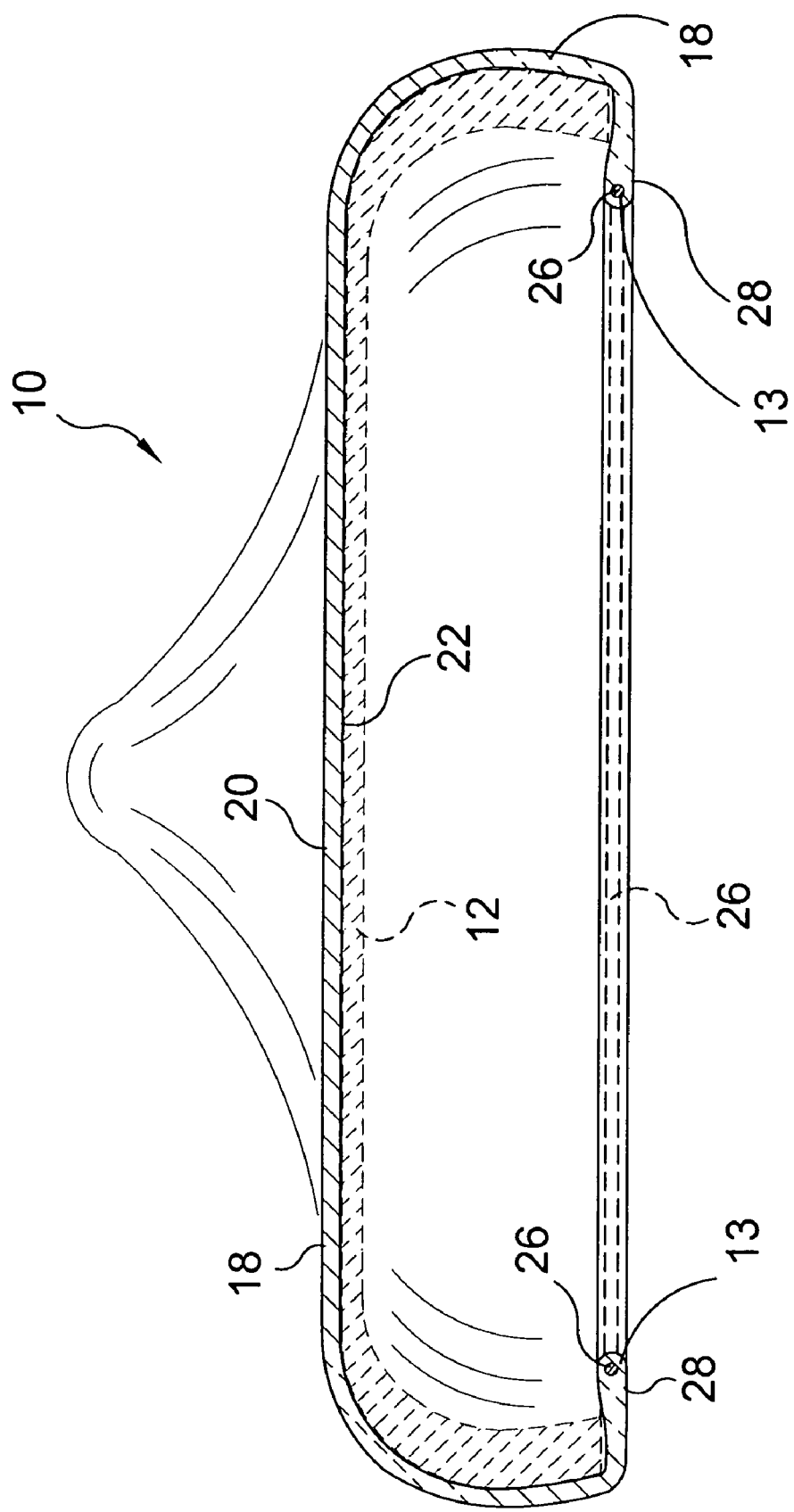
FIG. 8 is a sectional view of the seat cover having a drawstring for securing the seat cover to the motorcycle seat.

FIG. 8 is a sectional view of the seat cover 10. Shown is a sectional view of the pliable motorcycle seat cover 10 of the present invention having securing means 13 to prevent displacement of seat cover 10 once attached to motorcycle seat 12. As illustrated, the securing means is comprised of drawstring 26 positioned within the hem 28 of seat cover 10. As aforementioned, the securing means 13 includes either an adhesive band having a peelably removable backing sheet 25 and/or an elastic band 16 positioned along the cover 10 hem 28 and/or drawstring 26 positioned within the periphery edge of cover 10 with all of the aforementioned securing means 13 serving to secure placement of the cover 10 when releasably fastened to a motorcycle seat 12 that a user is desirious of protecting from chemical agents, water and inclement weather. It should also be noted that the protective seat cover 10, having various securing means 13, can be selectively discarded after a single use or remain as a motorcycle seat protective cover until such time as the user desires to discard or replace the protective cover 10.

Figure 9:
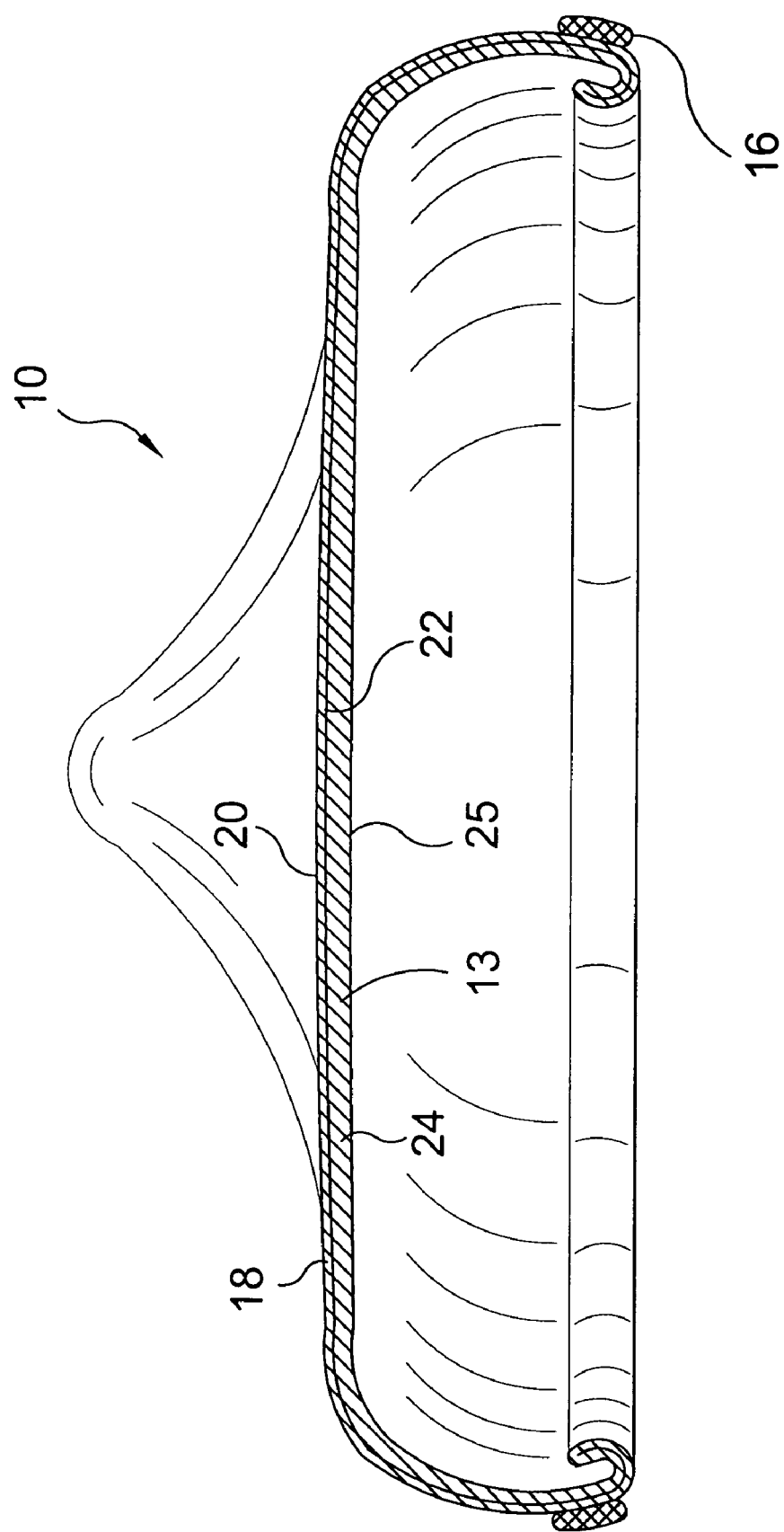
FIG. 9 is a sectional view of the seat cover having an additional element.

FIG. 9 is a sectional view of the seat cover 10 having an additional element. Shown is a sectional view of the motorcycle seat cover 10 of the present invention incorporating an additional element wherein the seat cover fastening means 13 is an adhesive layer 24 having a peelably removable backing sheet 25 that is selective removable prior to application The cover is comprised of a chemically resistive, impermeable material 18 having waterproof and soil proof capabilities for protecting the seat top and sides and extends over the lower edge of the bottom providing for runoff and to prevent wicking of the liquid into the bottom. The seat cover 10 is designed to protect the seat during application of water, detergents and cleaners and keep the seat dry during inclement weather. It can also prevent power failure while the motorcycle is in motion, keeping the motorcyclist and passenger safety from being compromised.

Figure 10:
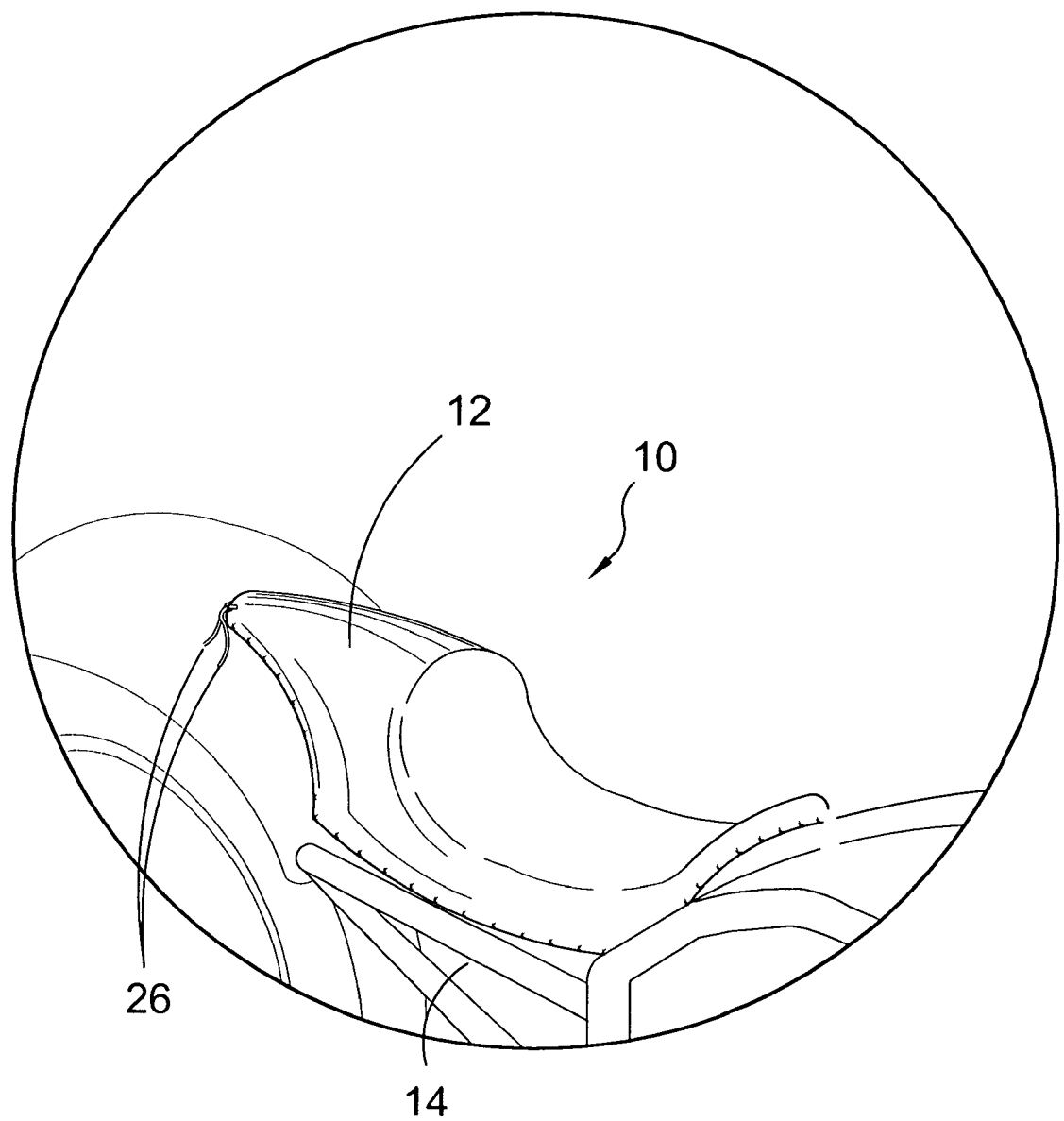
FIG. 10 is a perspective view of the present invention incorporating additional elements.

FIG. 10 is a perspective view of the present invention 10 incorporating drawstring 26 as the securing means 13 installed for attachment to seat 12 of a motorcycle 14 for cinching the seat cover 10 to the motorcycle seat 12.

Figure 11:
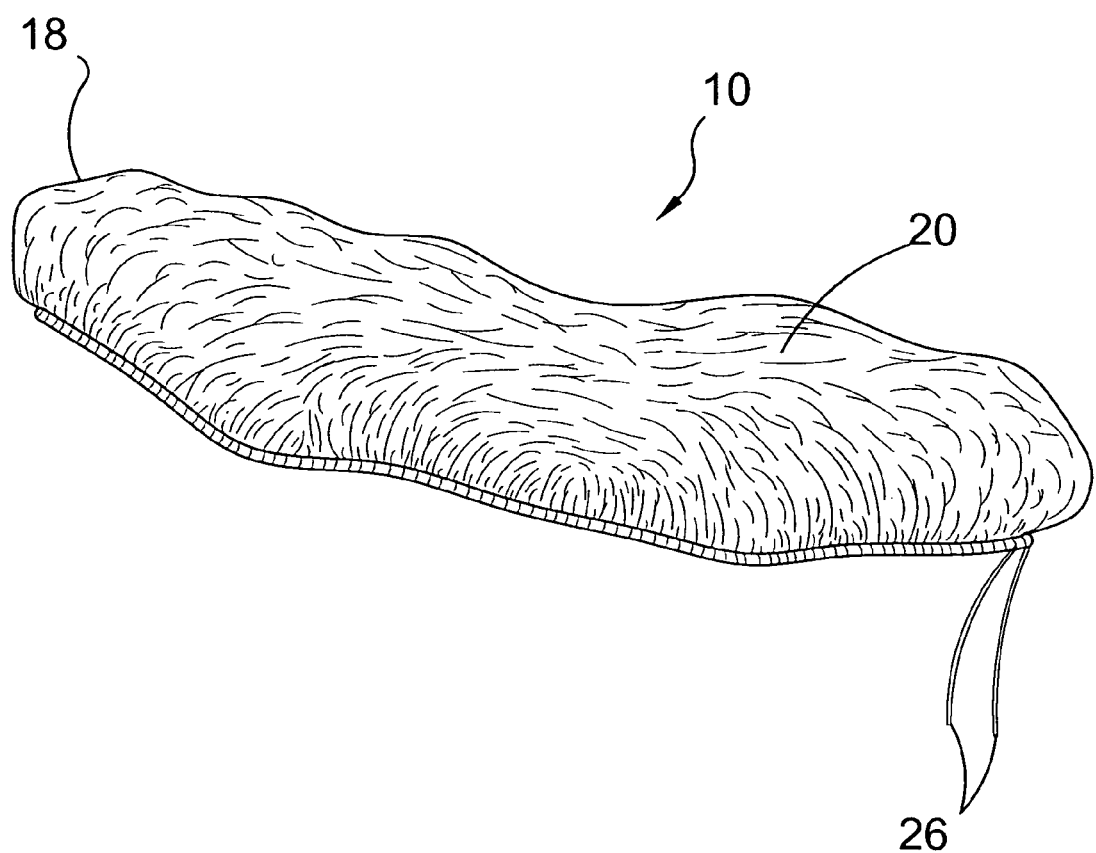
FIG. 11 is a perspective view of the present invention.

FIG. 11 is a perspective view of the present invention 10. Shown is the present invention a seat cover 10 for a motorcycle seat comprising a top side 20 manufactured of a chemically resistive material 18 having waterproof and soil proof capabilities. Additionally, the seat cover 10 can have a drawstring 26 for cinching the cover to the motorcycle seat, In addition to the previously described securing means 13 comprising an adhesive layer 25, adhesive band 15, and elastic band 16, which can be used singularly or in combination with one another.

Figure 12:
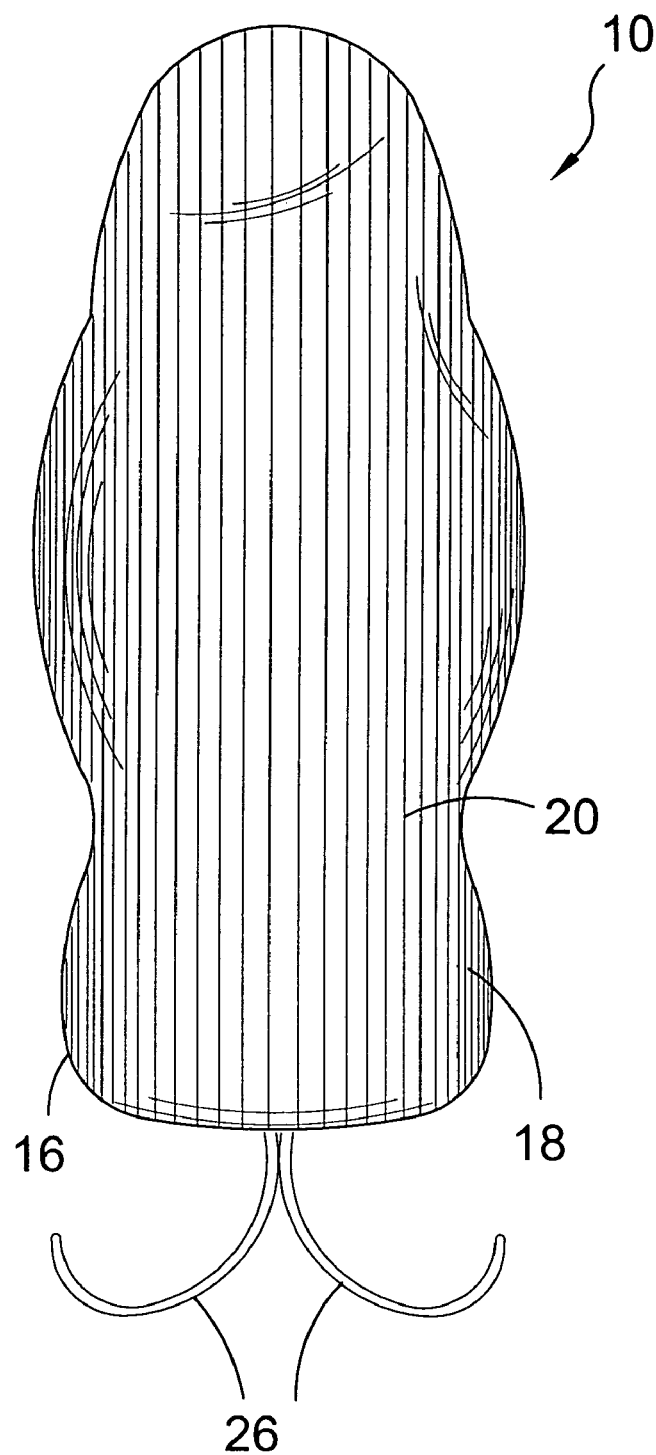
FIG. 12 is a top view of the present invention.

FIG. 12 is a top view of the present invention 10. Shown is the present invention, a motorcycle seat cover 10 having a top side 20 comprised of a chemically resistive material 18 having water proof and soil proof capabilities. The device is designed to protect a motorcycle seat from the elements and provides an elastic band 16 that encompasses the lower peripheries of said seat cover with a drawstring 26 to further secure the cover to said motorcycle seat.

Figure 13:
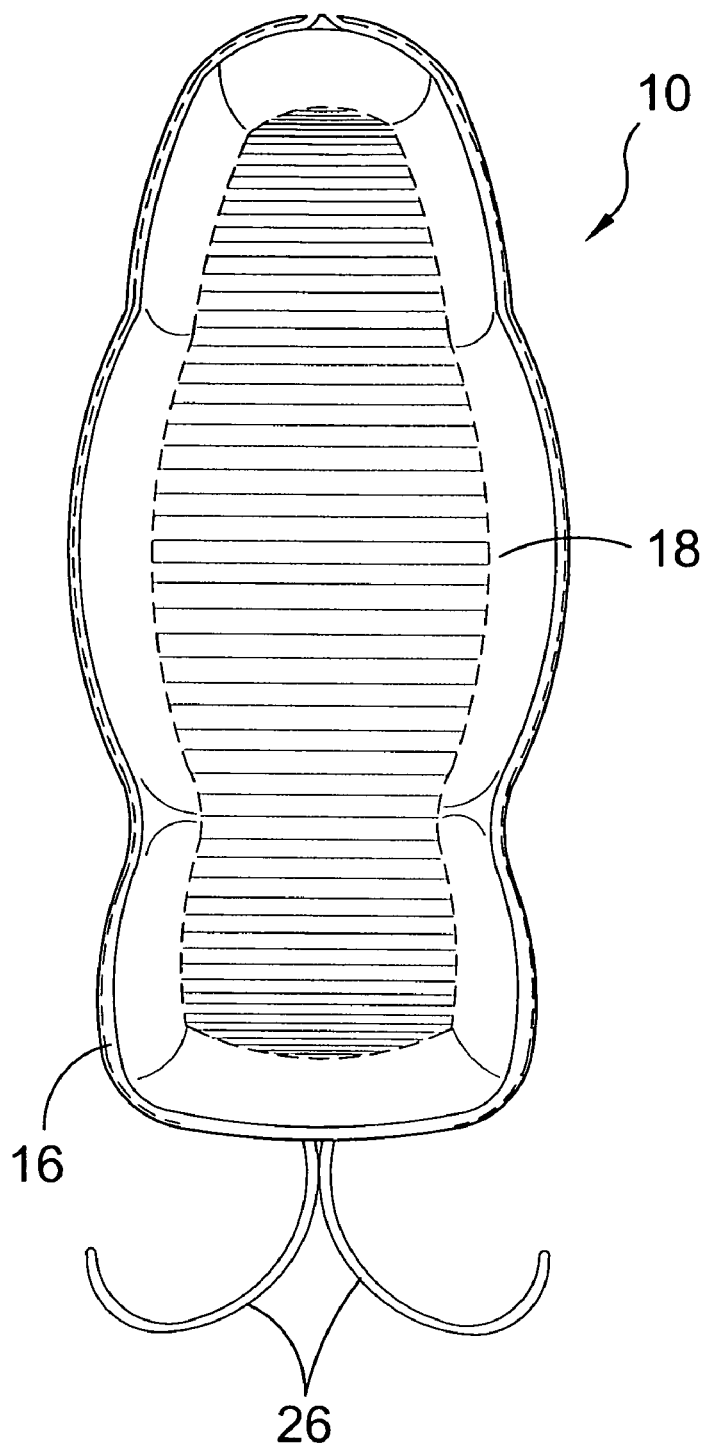
FIG. 13 is a bottom view of the present invention.

FIG. 13 is a bottom view of the present invention 10. Shown is the present invention, a motorcycle seat cover 10 comprised of a chemically resistive material 18 having water proof and soil proof capabilities. The device is designed to protect a motorcycle seat from the elements and provides an elastic band 16 that encompasses the lower peripheries of said seat cover 10 with a draw string 26 to further secure the cover 10 to said motorcycle seat.

Figure 14:
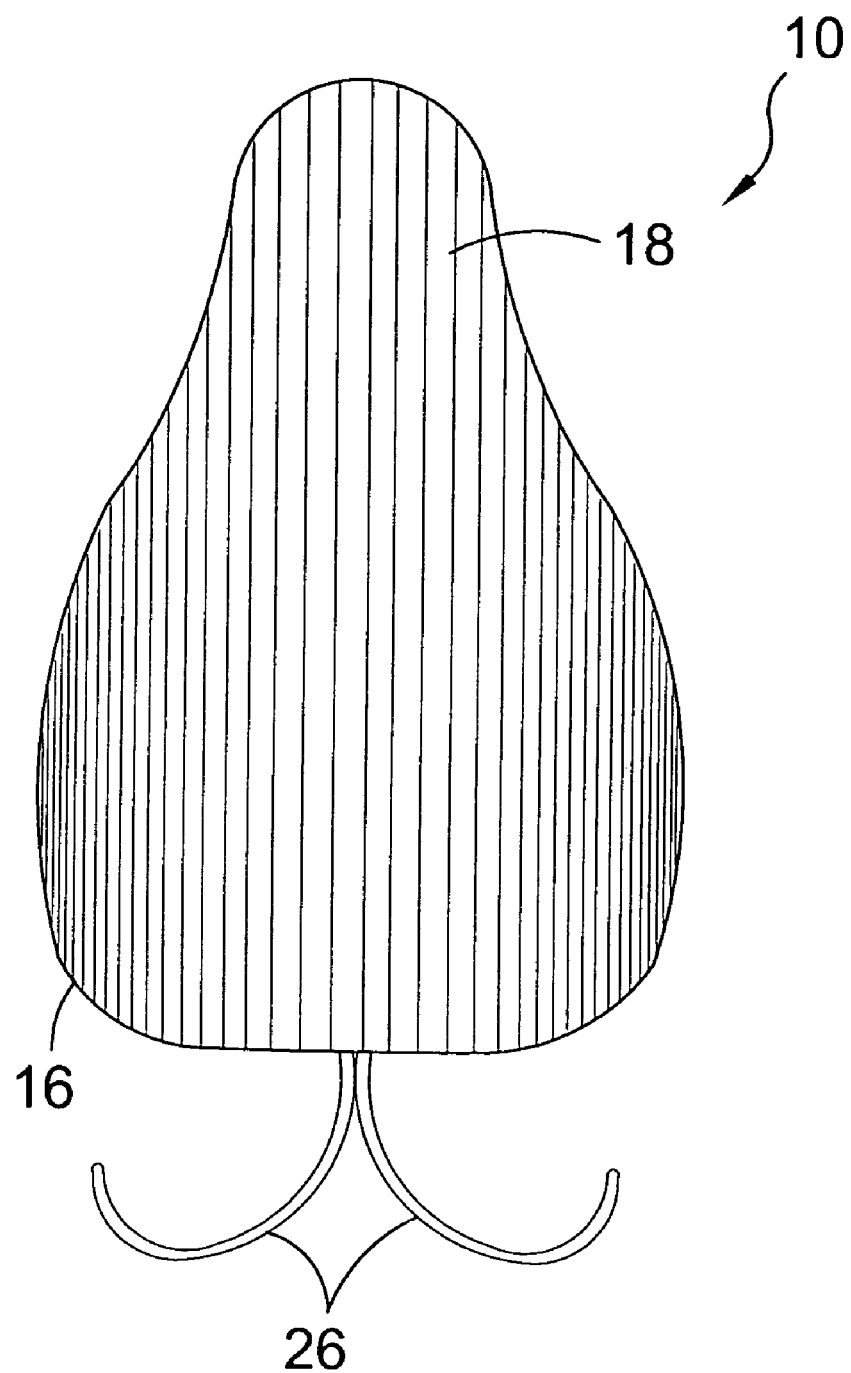
FIG. 14 is a top view of a second shape of the present invention.

FIG. 14 is a top view of a second shape of the present invention 10. Shown is the present invention, a motorcycle seat cover 10 comprised of a chemically resistive material 18 having water proof and soil proof capabilities. The device is designed to protect a motorcycle seat from the elements and provides an elastic band 16 that encompasses the lower peripheries of said seat cover with a draw string 26 to further secure the cover 10 to said motorcycle seat.

Figure 15:
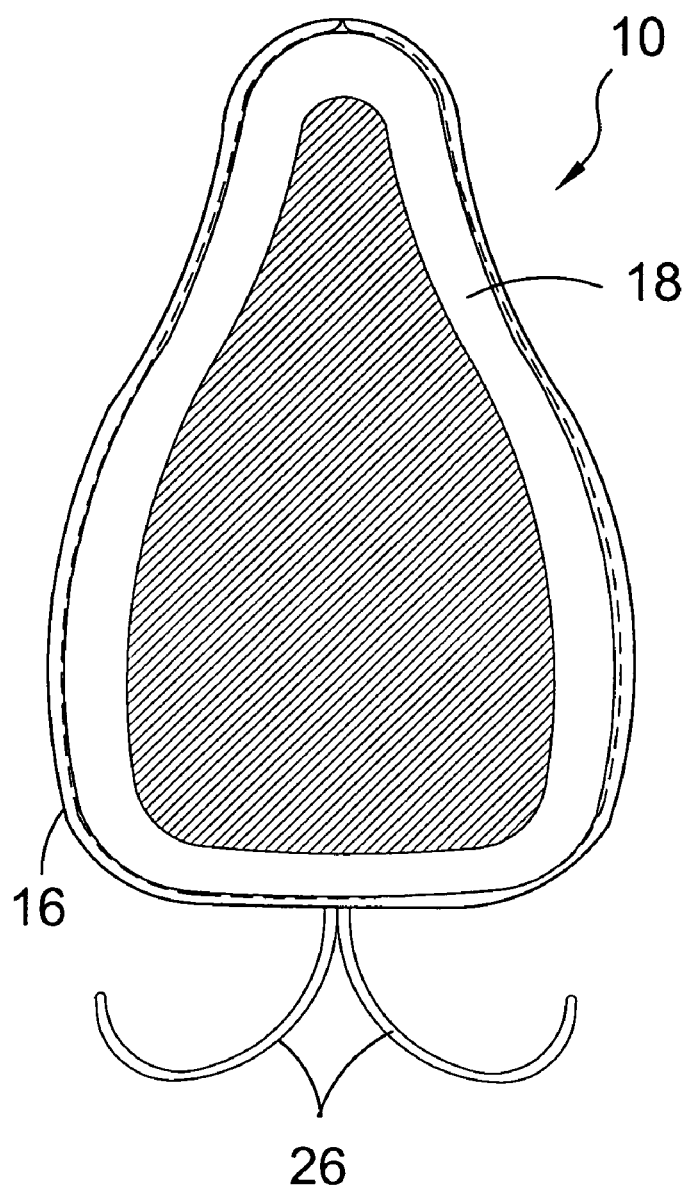
FIG. 15 is a bottom view of a second shape of the present invention.

FIG. 15 is a bottom view of a second shape of the present invention 10. Shown is the present invention, a motorcycle seat cover 10 comprised of a chemically resistive material 18 having water proof and soil proof capabilities. The device is designed to protect a motorcycle seat from the elements. It can also help prevent power failure from water while the motorcycle is in motion keeping the motorcyclist and passenger safety from being compromised. An elastic 16 band that encompasses the lower peripheries of said seat cover with a drawstring 26 to further secure the cover to said motorcycle seat.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. Covering means for protecting a motorcycle seat and its underlying electrical components from liquids and chemical cleaning compounds comprising:
    a) protective means comprising a pliable sheet encompassing top and sides of said motorcycle seat to prevent contact with contaminants;
    b) retaining means for retaining said covering means upon placement by a user on said motorcycle seat; and
    c) said retaining means comprising an adhesive layer on an underside of said pliable sheet extending inwardly and beyond a peripheral edge of said seat and an annular elastic band in direct contact with said seat solely through an adhesive layer.

2. The protective means as recited in claim 1, wherein said pliable sheet is a motorcycle seat cover fabricated of an impermeable resistant material.

3. The protective means as recited in claim 1, wherein said pliable sheet comprises a two-ply sheet having a top side fabricated of a chemically-resistant impermeable material and a bottom side comprised of a plush material.

4. The protective means as recited in claim 1, wherein said pliable sheet is shaped to conform appropriately for encompassing various types of motorcycle seats.

5. The protective means as recited in claim 1, wherein said pliable sheet incorporates a hem forming a drip line whereby fluid and the other contaminants will precipitate from said pliable sheet.

\* \* \* \* \*